(12) United States Patent
Gecík

(10) Patent No.: US 9,371,864 B2
(45) Date of Patent: Jun. 21, 2016

(54) CONSTANT VELOCITY JOINT

(75) Inventor: Martin Gecík, Prešov (SK)

(73) Assignee: COMBLAX S.R.O. (SK)

( * ) Notice: Subject to any disclaimer, the term of this patent is extended or adjusted under 35 U.S.C. 154(b) by 0 days.

(21) Appl. No.: 14/129,162

(22) PCT Filed: Jun. 25, 2012

(86) PCT No.: PCT/SK2012/050010
§ 371 (c)(1),
(2), (4) Date: Dec. 24, 2013

(87) PCT Pub. No.: WO2013/002743
PCT Pub. Date: Jan. 3, 2013

(65) Prior Publication Data
US 2014/0141893 A1    May 22, 2014

(30) Foreign Application Priority Data

Jun. 27, 2011    (SK) .......................... 63-2011

(51) Int. Cl.
*F16D 3/30*    (2006.01)

(52) U.S. Cl.
CPC ............... *F16D 3/30* (2013.01); *Y10S 464/905* (2013.01)

(58) Field of Classification Search
CPC ............................. F16D 3/30; Y10S 464/905
USPC .................... 464/109, 112, 904, 905
See application file for complete search history.

(56) References Cited

U.S. PATENT DOCUMENTS

| 1,665,280 | A | | 4/1927 | Rzeppa |
| 1,916,442 | A | | 8/1929 | Rzeppa |
| 2,010,899 | A | | 4/1935 | Rzeppa |
| 2,627,734 | A | * | 2/1953 | Villard .......................... 464/109 |

FOREIGN PATENT DOCUMENTS

| CN | 101 956 769 | 1/2011 |
| DE | 1 800 012 | 4/1970 |

(Continued)

OTHER PUBLICATIONS

International Search Report dated Oct. 2, 2012 issued in corresponding International patent application No. PCT/SK2012/050010.

(Continued)

*Primary Examiner* — Gregory Binda
(74) *Attorney, Agent, or Firm* — Ostrolenk Faber LLP

(57) ABSTRACT

The constant velocity joint has the input shaft (1), the output shaft (2), two toothed spherical left arms (4L), two toothed spherical right arms (4R), and the stabilizing mechanism (3). The stabilizing mechanism (3) is made up of stabilizing segments (3.1) and (3.2). Stabilizing segments have limited degrees of freedom except the possibility of partial rotation around the axis of the stabilizing mechanism (3). Each stabilizing segment (3.1) or (3.2) is associated with one toothed spherical left arm (4L) and one toothed spherical right arm (4R) attached by means of bolts (6) and two groups of rolling elements (8) such that they can only rotate around the axes of the bolts (6). The input shaft (1) carries on its body two arms (1.1) and (1.2). The output shaft (2) carries on its body two arms (2.1) and (2.2). In arms of both shafts there are outer rolling paths created for groups of rolling elements (9), which perform the function of radial-axial bearings. The input shaft (1) is attached to the assembly of the stabilizing mechanism and the spherical arms through the two bolts (7), which pass through the radial-axial bearings in the arms of the shaft (1.1) and (1.2), and are attached into spurs on the corresponding spherical arms (4L) and (4R). The output shaft is connected in the same way.

8 Claims, 15 Drawing Sheets

(56) References Cited

FOREIGN PATENT DOCUMENTS

| | | |
|---|---|---|
| FR | 652829 | 3/1929 |
| JP | 4-83917 | 3/1992 |
| WO | WO 02/077479 A1 | 10/2002 |

OTHER PUBLICATIONS

Written Opinion dated Oct. 2, 2012 issued in corresponding International patent application No. PCT/SK2012/050010.

* cited by examiner

CONSTANT VELOCITY JOINT

CROSS REFERENCE TO RELATED APPLICATIONS

The present application is a 35 U.S.C. §371 National Phase conversion of PCT/SK2012/050010, filed Jun. 25, 2012, which claims benefit of Slovakia Application No. PP 63-2011, filed Jun. 27, 2011, the disclosure of which is incorporated herein by reference. The PCT International Application was published in the English language.

TECHNICAL FIELD

The subject of the invention is a constant velocity joint. The invention deals with transfer of rotations and torque from one shaft to another in a way that rotations and angular velocity at the input and output shaft are still the same with various values of angle, which both shafts may form together. The condition of equal angular velocities represents a basic condition for classification of a joint as a constant velocity joint. The invention relates to so-called fixed type of a constant velocity joint, where each shaft has a fixed position considering the joint central point, and cannot move in axial direction along its axis.

BACKGROUND ART

The problem of mutual connection of two rotating shafts in a way that energy and rotations are transferred from one shaft to another is encountered in engineering industry practically from its origin. Mutual position of shafts may vary, and adequate solutions for mutual connection of shafts exist for their various positions.

One of the most common situations is a situation, where the axis of a driving (input) shaft intersects in one point the axis of a driven (output) shaft, the angle between both axes of shafts is variable during operation and shafts cannot move in direction from or to the centre of a joint. A typical example of such type of connection is a constant velocity joint in the front axle of a vehicle with front drive, which connects the shaft of the front wheel with a half-axle protruding from the vehicle gear.

The first usable type of this kind of connection of two shafts was apparently a joint of an Italian inventor, Girolamo Cardano, in the $16^{th}$ century, and its enhancement by Robert Hook in the $17^{th}$ century. Universal joints, based on ideas of these two early-modern period scientists, are used by now, especially in agricultural machines, trucks, etc. Disadvantage of such designed joints consists in fact that angular velocity at the output shaft differs from angular velocity at output cyclically during each rotation, and it depends on mutual angle of shafts. The condition of equal angular velocities with this solution can be met in a way that both joints placed one after another are used so that the angle of the input shaft and joint axis is still the same as the angle of joint axis and the output shaft. In practice, however, it is a problem to achieve equal angles, and therefore, such types of joints are used only in applications, where homokineticity is not a critical characteristic.

The most frequently used type of a constant velocity joint is at present most probably a joint of so-called Rzeppa-type or "Ball-Type CV joint" (where CV stands for constant velocity). Most present solutions are more or less based on U.S. Pat. No. 1,665,280 of 1927, U.S. Pat. No. 1,916,442 of 1929, U.S. Pat. No. 2,010,899 of 1933 or other patents of the same author.

The arrangement of this type of a joint is generally based on six balls, which roll in paths with semicircular cross section, formed at outer ball surface of the input shaft and lie in planes crossing the shaft axis. The output shaft has a similar grooves formed, but located in inner surface of ball cavity of the output shaft. Each ball touches both the groove on the inner shaft and the groove on the outer shaft. The very important part of this joint is a massive metal cage, which is to keep centres of balls in a homokinetic plane. At one moment each ball touches the path on the inner shaft, on the outer shaft, and some of faces of openings placed on the massive cage. The big disadvantage of this type of a joint is the fact that entire loading transferred by the joint is actually transferred only by contact between the ball and outer and inner rolling path. Considering the small amount of balls, the tension in contact places is very high, and its size significantly limits maximum transferred performance and life of the entire joint. Rolling of balls in paths has not only rolling nature, but each ball has to turn around the axis, which is perpendicular to the shaft axis. Slipping of ball toward paths occurs, from which friction results. Another place where friction arises is in a place of contact of the ball and the cage, where only sliding friction always arises. The rate of sliding friction in this type of a joint is rather high, and shows mainly in considerable production of heat with bigger angles of joint tilting. The cage is inevitable for this type. The joint would not be able to work without it. Its homokineticity depends on quality of the cage and quality of its placing in this joint. And whereas the cage has to have a certain clearance, the joint of this type is not 100 percent homokinetic then. Another big disadvantage of this type of a joint is its zero tolerance to axial forces. The joint is not able to transfer any axial loading. The production of the joint is demanding, as it requires special machines for production and grinding of rolling paths in the cavity of ball shape.

Apart from above mentioned types of joints a big amount of more or less homokinetic solutions have been developed, which did not make the right at all or are used very rarely. These include, for instance, Tracta-type joints, represented, for instance, by the document FR 652829, Bendix-Weiss-type joints, represented, for instance, by the document DE 1 800 012, and the like.

SUMMARY OF THE INVENTION

A new principle and technical solution of a constant velocity joint, which differs from commonly used solutions, is the substance of the invention. The aim of the invention is to eliminate main shortcomings of known solutions, and to create a simple, reliable, and truly constant velocity joint.

According to this invention the constant velocity joint consists of the input and output shaft and several pairs of spherical arms. Nodes for rotation attachment of a spherical arm are provided at each shaft. Each shaft bears as many rotation nodes (bearings) as many pairs of spherical arms are used in the joint. The axis, around which each attached spherical arm can rotate, forms with the axis of the shaft an angle and passes through the central point of the joint—the homokinetic point (FIG. 1).

The spherical arm is a body created from an imaginary ball surface with a certain thickness. A node for rotation attachment to the shaft is created at one end of the spherical arm. A node for rotation attachment to another spherical arm of the pair is created on the other end of the spherical arm. Axes of both rotation nodes of each spherical arm form an angle γ, lie in one plane, and intersect each other (FIG. 2, FIG. 3). The angle γ, formed by the axes of both rotation nodes, should be the same at each arm. To prevent mutual rotation of shafts, it is necessary to somehow fix the common rotational axis of each pair of spherical arms to the homokinetic plane so that each mutual rotational axis is always lying in the homokinetic plane. A stabilising mechanism or simply a stabiliser will play this role in the joint of the presented invention.

A stabilising mechanism of the joint of the presented invention is placed in the space between the input and output shaft and consists of an equal number of segments as there is number of pairs of spherical arms. Each stabilising segment is rotationally connected to one pair of spherical arms so that the common rotational axis of spherical arms intersects the common rotational axis of stabilising segments. The common rotational axis of each pair of spherical arms attempts to depart from the homokinetic plane when rotating the input shaft to the output shaft. If segments would not be tied to each other, each stabilising segment would change its position relative to the homokinetic plane along with a pair of spherical arms. However, if all stabilising segments are connected so that all degrees of freedom are restricted leaving them only the possibility of mutual rotation around a single axis, then all common rotational axes of pairs of spherical arms are locked in the single plane. And since each spherical arm on one side of the homokinetic plane has the same angular length (i.e. the angle γ between two rotation axes is the same at each arm) as the other spherical arms on the other side of the homokinetic plane, the common rotational axis of spherical arms will lie always in the homokinetic plane and mutual rotation Φ of both shafts will not be possible. The joint designed so will be then homokinetic. At mutual offset of shafts by angle α, changes of angles $\eta_{11}$, $\eta_{12}$, and $\eta_{13}$ occur, which are formed by stabilising segments (FIG. 4). During one rotation of the joint with offset shafts these angles will vary in cycles—they will increase or decrease.

Each pair of spherical arms of the joint described by now has one common rotational axis, which was firmly fixed to one of segments of a stabilising device. To achieve the desired effect of stabilising of position of spherical arms to the homokinetic plane, it is not absolutely essential that each pair of spherical arms has one common rotational axis. It is therefore not essential that the rotational axis of the spherical arm lies directly in the homokinetic plane, but it is absolutely necessary to achieve that the angle formed by the rotational axis of spherical arm with the homokinetic plane is constant. The assumption, used in the joint arrangement, enables to create a joint dimensionally more efficient than in the previous case. In such designed joint, each stabilising segment bears instead of one common rotational axis for both arms two separate rotational axes.

By now, all joints were described, in which all rotational axes ran through one common point—a central point of the joint. In the first case, rotational axes of both arms were coaxial and lied directly in the homokinetic plane, and in the second case, rotational axes of two arms intersected each other in a central point of the joint, and each was inclined from the homokinetic plane by a fixed angle. It is possible to create a joint, when rotational axes of two spherical arms do not intersect at all. The arrangement of this type of the joint is almost identical with the previous joint, with the difference that each stabilising segment carries two rotational axes for attachment of spherical arms, which, however, do not intersect at one point, but are parallel. Each rotational axis for attachment of the spherical arm intersects the rotational axis of the stabilising segment in one point. Such designed joint has then two central points of the joint and also two homokinetic planes. It is also possible to create functional joints, in which rotational axes of spherical arms, carried by the stabilising mechanism, are intersected under the axis of the stabilising mechanism or above the same.

For joints with the number of pairs of spherical arms more than three regularities are the same as in previously described arrangements with three pairs of spherical arms. An important criterion is a relative position of spherical arms in each pair. As already described above, rotational axes of a pair of arms may be coaxial, they may intersect each other in the central point of the joint, they may be parallel and not intersect at all, or they may intersect each other, but their intersection does not lie in the axis of the stabilising mechanism.

From an economic and design point of view it would be interesting to reduce the number of pairs of spherical arms only to two. Number of arms on each of the shafts would be also reduced to two, as well as the number of segments of the stabilising mechanism. The joint designed in this way is not stabilised, because it does not prevent mutual rotation of the input and output shaft. It is necessary to add an extra feature to this design of the joint, which was not necessary with joints with number of pairs of spherical arms three or more. With joints with number of pairs of spherical arms three and more the stabilising effect of the stabilising mechanism manifests in a way that in each pair of stabilising arms one arm forms with the homokinetic plane the same angle as the other arm of the pair forms with the plane. It could be said that the homokinetic plane simulates a mirror—the position of spherical arms on one side of the homokinetic plane is the mirror image of the position of spherical arms on the other side of the homokinetic plane. Therefore, it is necessary to add the function of mirror position of spherical arms relative to the homokinetic plane into the joint with number of pairs of spherical arms equal to two. This means that movement of one spherical arm of the pair must be proportionally sychronised with the movement of the second spherical arm of the same pair. The angle $\epsilon_1$, by which one spherical arm of the pair is departed from the homokinetic plane, has to have the same size as the angle $\epsilon_2$, by which the other spherical arm of the same pair departs from the homokinetic plane. There are many technical designs that are capable to ensure a mirror and proportional movement of two bodies. With this joint it is preferred to use a gear with gear ratio 1:1 so that the toothing will be directly integrated or tightly coupled with spherical arms in the place, where both spherical arms of the same pair are closest to each other. In FIG. 6 each pair of spherical arms is provided with a toothed part and both toothed parts are engaged. In FIG. 7 a joint with two pairs of toothed spherical arms is depicted. A function, which the toothing performs in this joint, can be implemented in addition to various types of toothing by a cam gear or the like.

According to mutual position and arrangement of spherical arms and segments of the stabilising mechanism, also a joint with two pairs of spherical arms can be made as a joint, where rotational axes of the pair of arms may be coaxial, they can intersect in the central point of the joint, they may be parallel and do not intersect at all, or they may intersect each other, but their intersection does not lie on the axis of the stabilising mechanism.

The main advantage of a constant velocity joint according to this invention is simplicity of shape of its individual parts and low production costs, especially compared to today, perhaps the most widespread joints of so-called Rzeppa-type or "Ball-Type CVJ". In contrast to this approach, the joint according to this invention is truly homokinetic, it is able to bear axial loads, and there are no nodes with sliding friction. A significantly higher efficiency of this new joint and significantly higher lifetime can be expected. Considerably higher dimension of tilt angle of shafts, which can be several times higher than it is normal at present, is another significant advantage, compared to today's most widespread concept.

DESCRIPTION OF PREFERRED EMBODIMENTS

It is understood that the individual embodiments of the constant velocity joint according to the present invention are shown by way of illustration only and not as limitations. Those skilled in the art will recognize, or be able to ascertain using no more than routine experimentation, many equivalents to the specific embodiments of the invention. Such equivalents are intended to be encompassed by the following claims. Those skilled in the art would have no problem dimensioning the constant velocity joint and choosing suitable materials and design configurations, which is why these features were not designed in detail.

Figure 1:
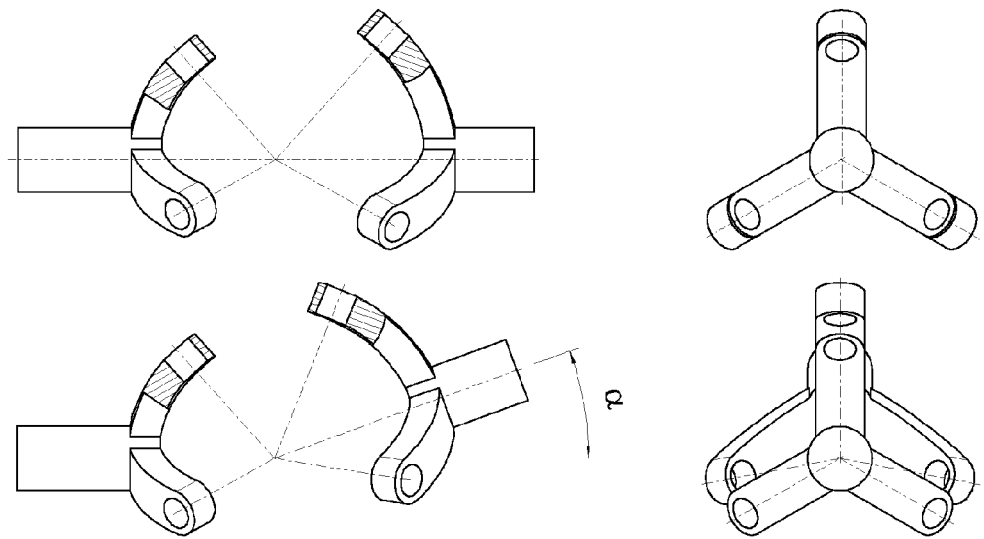
FIG. 1 shows the input and output shaft of a constant velocity joint in a front and side view in two states—when the axes of both shafts are identical and when they form the angle α.
Figure 2:
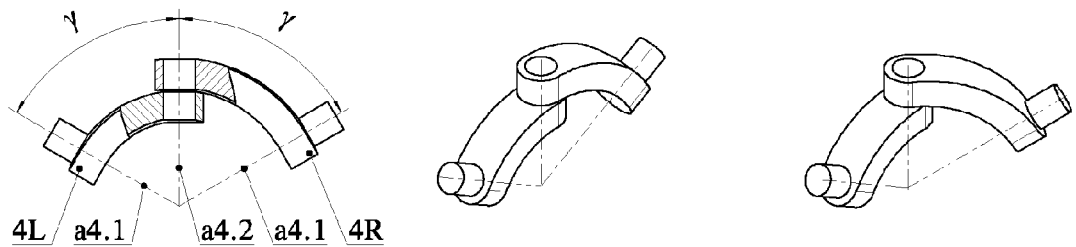
FIG. 2 shows a pair of spherical arms with a single rotational axis.

Example No. 1 of the embodiment of the invention is shown in FIG. 8 through FIG. 11. It is a constant velocity joint, where three pairs of spherical arms are used. Each pair then consists of a spherical arm 4L, located closer to the centre of the joint, and one arm 4R, which is located above the arm 4L. Each spherical arm (both 4L and 4R) is rotationally connected with the shaft 1 or 2 by one its end and with the stabilising mechanism 3 by another. Both axes of rotating nodes a4.1 and a4.2, around which the spherical arm (both 4L and 4R) is rotating considering the input shaft 1 or output shaft 2, lie in one plane (FIG. 2). The stabilising mechanism 3 is formed in the middle by placing of the stabilising segment 3.2 and two stabilising segments 3.1 and 3.3, which are identical in shape. A rolling path is created in both segments, which forms a part of the integrated radial-axial bearing. A pin with a bevelled edge, which is used as a part of the inner surface of the radial-axial bearing, is created in the middle stabilising segment on each side. The remaining inner part of a rolling surface of the radial-axial bearing is formed on heads of bolts 11. Rolling elements 10 may be formed by balls or rollers in angular patterns. By inserting rolling elements 10 into rolling paths of stabilising segments 3.1 and 3.3 and screwing two bolts according to FIG. 8 a stabilising mechanism 3 is created, in which all three stabilising segments 3.1, 3.2 and 3.3 can rotate just round the axis a3 of the stabilising mechanism. To attach spherical arms 4L and 4R to the stabilising mechanism 3 and to both shafts a similar radial-axial bearing as in the stabilising mechanism is used. On one side of bodies of both arms 4L and 4R there are openings with the outer rolling path. One part of the inner rolling path of the radial-axial bearing is formed on the spur, carried by each of the stabilising segments 3.1, 3.2 and 3.3. The second part of the inner rolling path of the radial-axial bearing is formed on the head of the bolt 6 and on both sides of a distance element 12. Connection of spherical arms 4L and 4R with the input shaft 1 and output shaft 2 is designed similarly.

Figure 3:
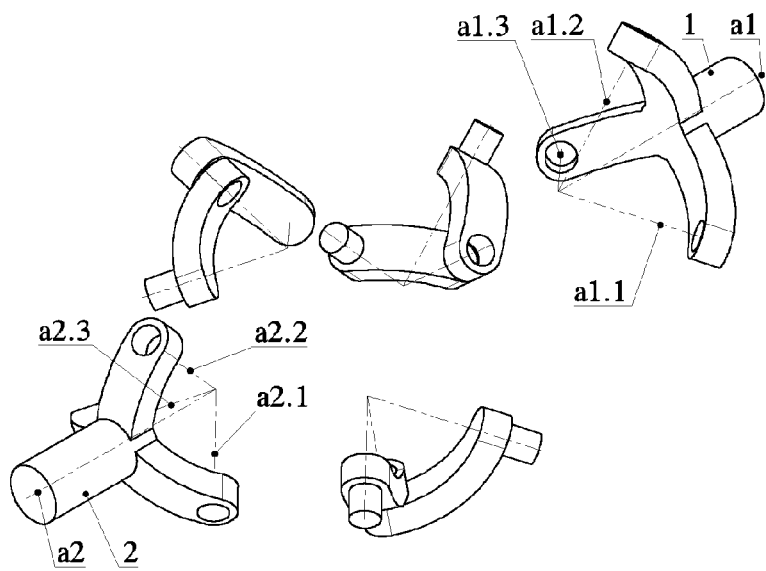
In FIG. 3 there is a spatial view of basic components of the joint in an exploded state.
Figure 4:
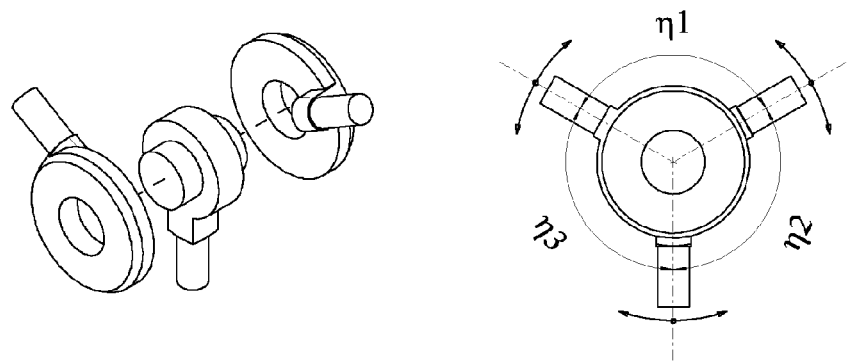
In FIG. 4 on the left, there is an exploded view of basic elements of the stabilising mechanism-stabilising segments. In the right part of the figure the letters $\eta_1$, $\eta_2$, and $\eta_3$ indicate angles, which are formed by rotational axes between each other, supported by stabilising segments.
Figure 5:
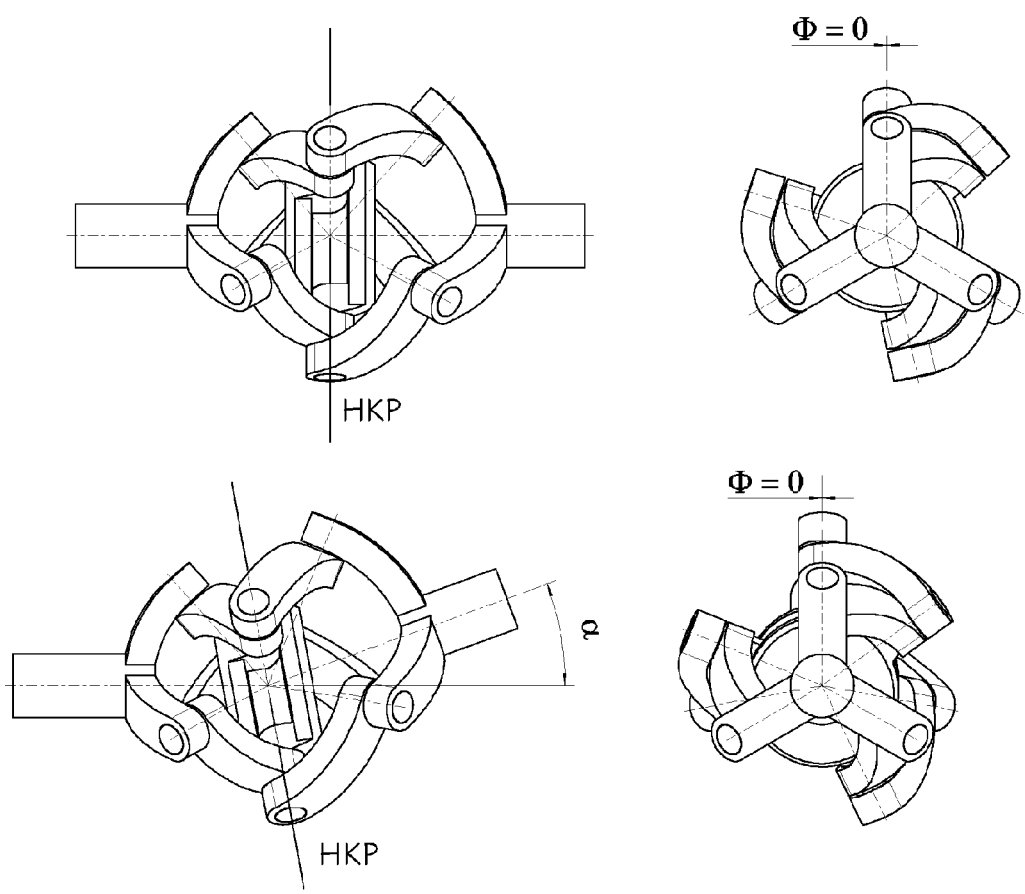
In FIG. 5 there is a joint shown in two states in a front and side view, with implemented stabilising mechanism. The value of mutual rotation of shafts Φ equals to zero.
Figure 6:
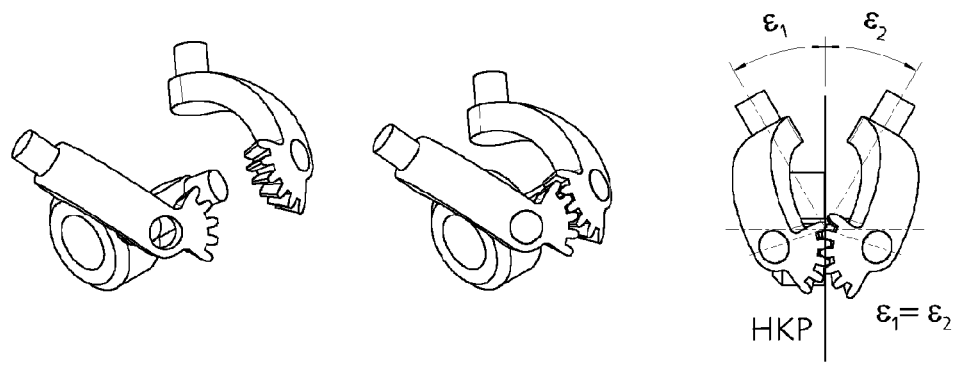
In FIG. 6 there is a modification of a pair of spherical arms and respective stabilising segment displayed, the purpose of which is to provide for a mirror proportional movement of both arms in relation to the homokinetic plane. Rotational axes of spherical arms, supported by stabilising elements, intersect in the axis of the stabilising mechanism.
Figure 7:
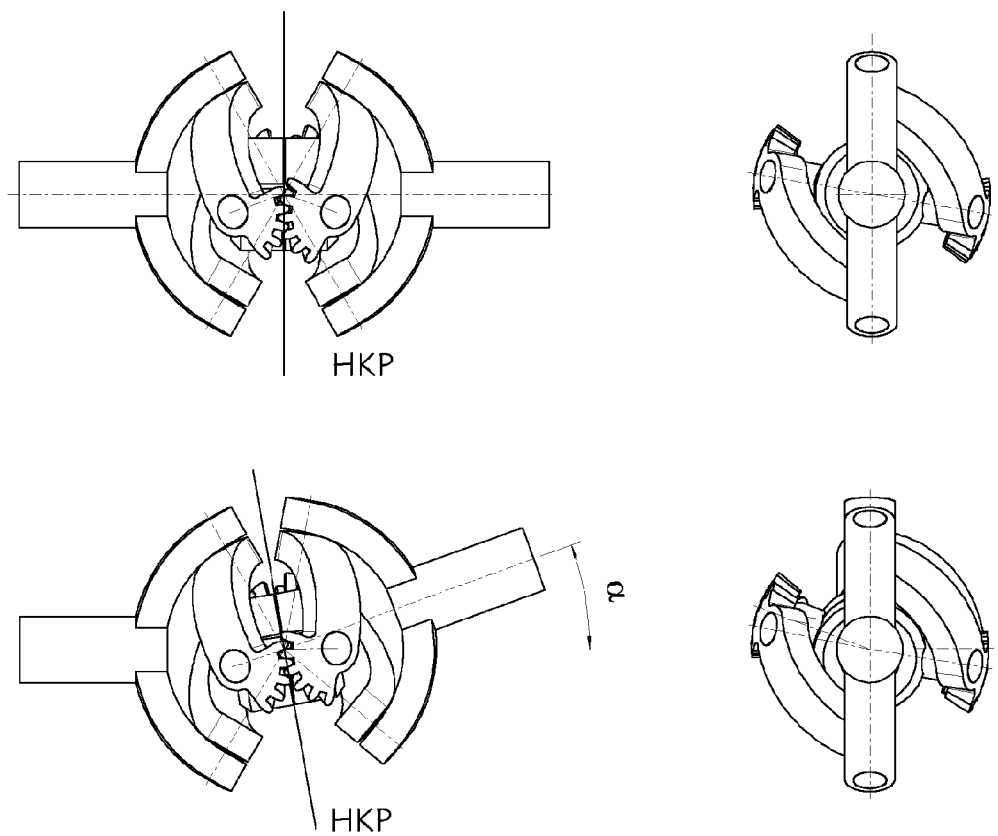
In FIG. 7 there is a joint with applied modified pairs of spherical arms of FIG. 6.
Figure 8:
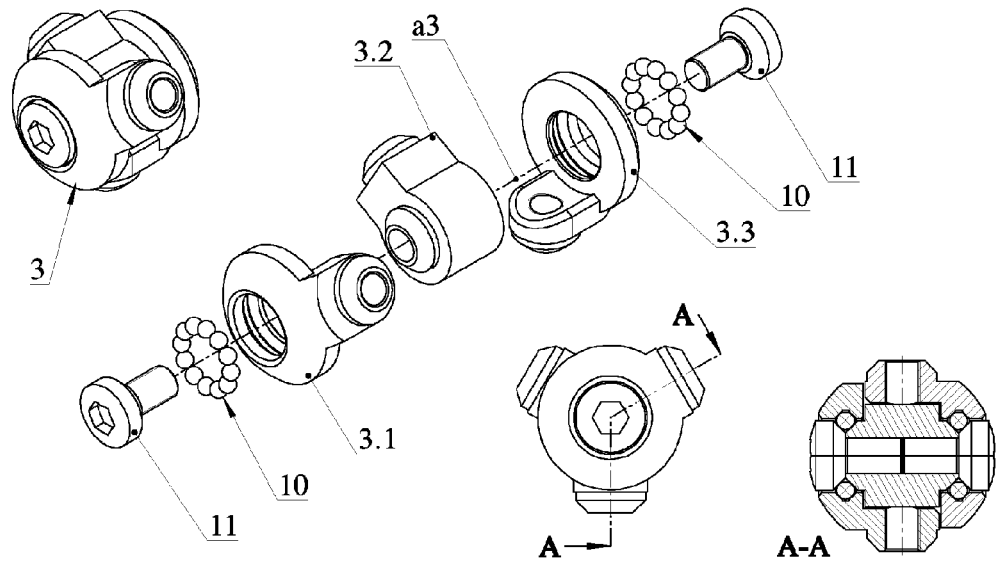
In FIG. 8 the stabilising mechanism with three pairs of spherical arms, which are arranged coaxially.
Figure 9:
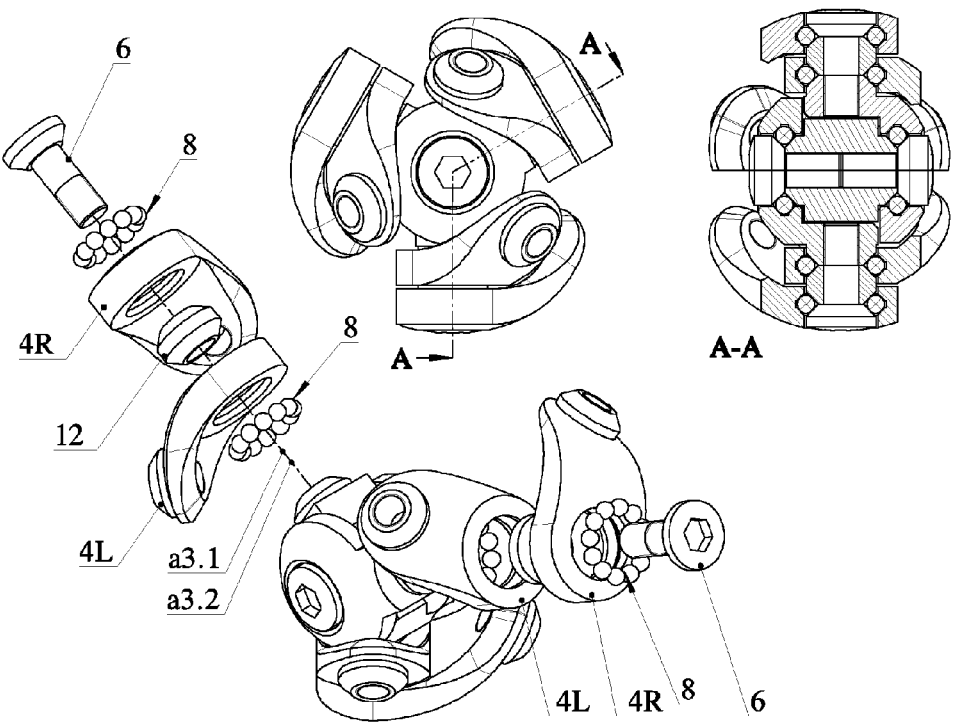
FIG. 9 presents the stabilising mechanism with attached spherical arms, designed for the joint with three pairs of coaxially placed spherical arms.
Figure 10:
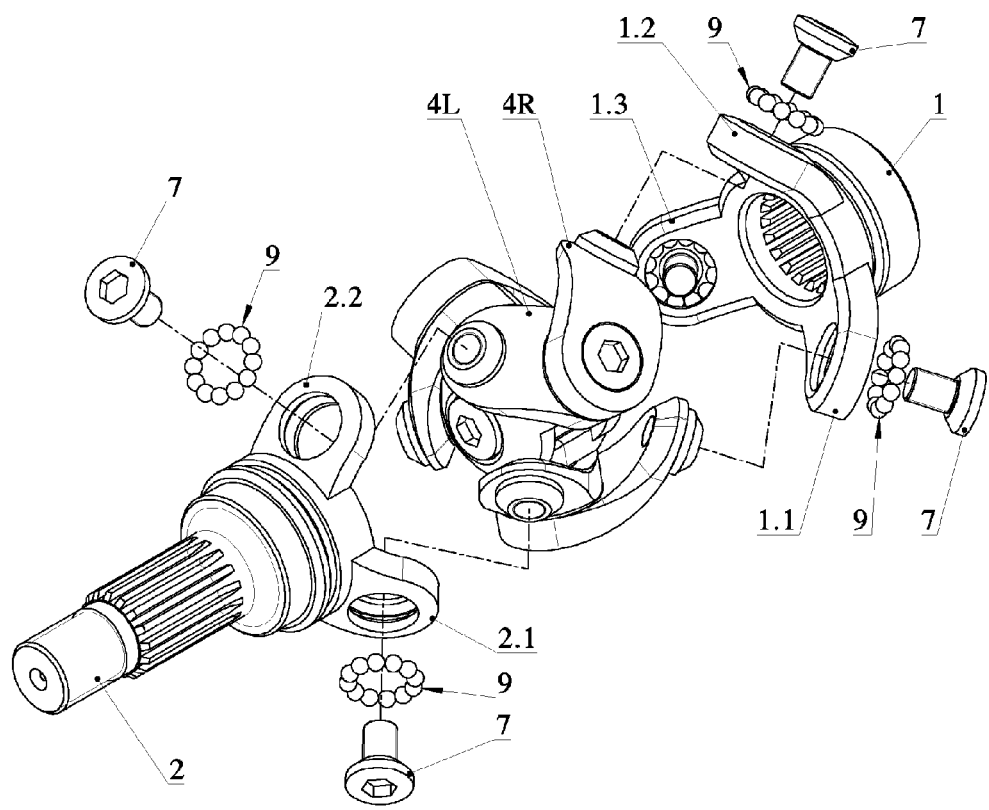
In FIG. 10 a constant velocity joint is shown in a spatial, partially exploded view, with three pairs of spherical arms, which are arranged coaxially.
Figure 11:
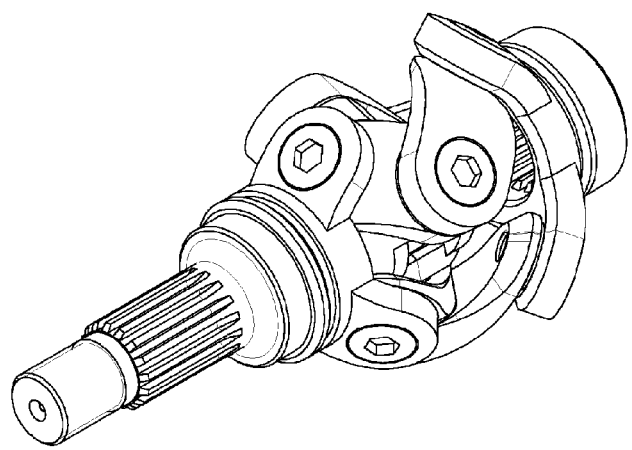
In FIG. 11 there is the joint of FIG. 10 shown in an un-exploded state.
Figure 12:
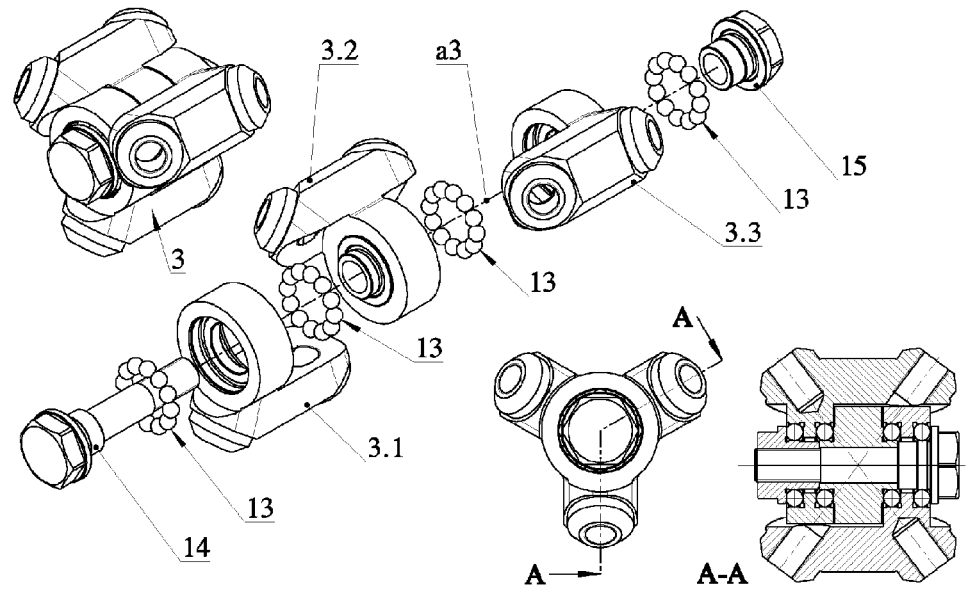
In FIG. 12 a stabilising mechanism is shown in several views of the joint with three pairs of spherical arms, where the axes of each pair of spherical arms have the common intersection with the axis of the stabilising mechanism.
Figure 13:
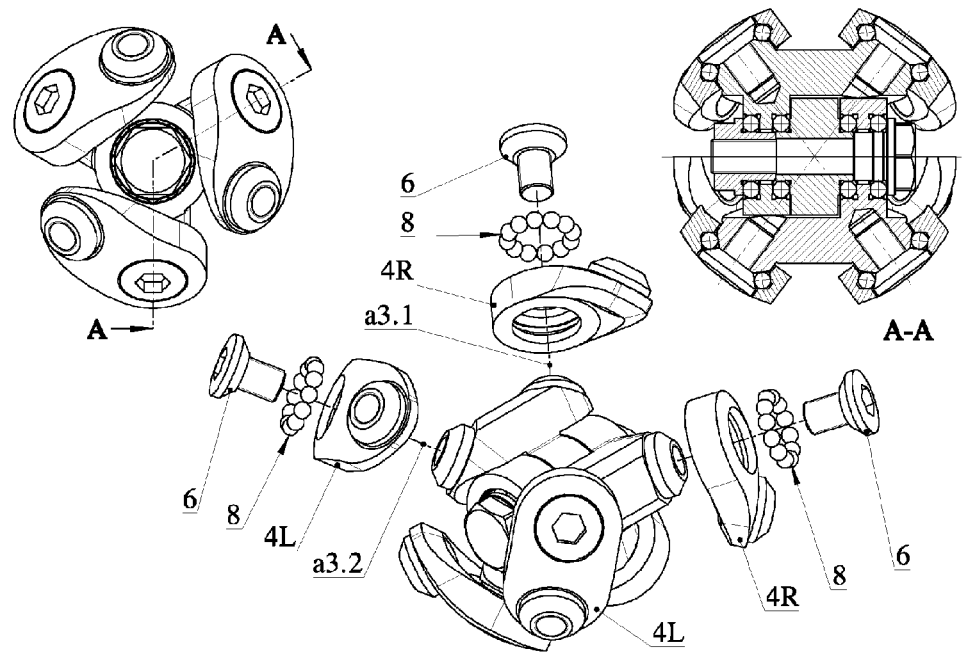
FIG. 13 introduces the stabilising mechanism with attached spherical arms, designed for the joint with three pairs of spherical arms, where the axes of each pair of spherical arms have the common intersection with the axis of the stabilising mechanism.
Figure 14:
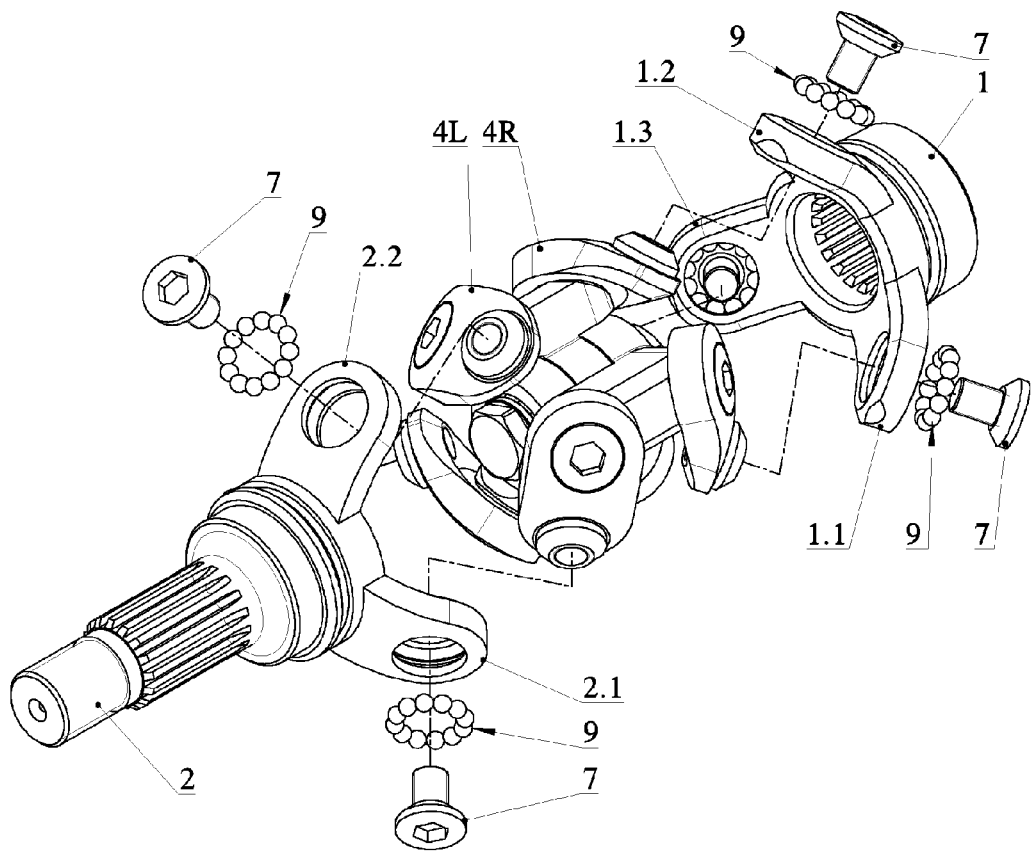
In FIG. 14 a constant velocity joint is shown in a spatial, partially exploded view with the stabilising mechanism and spherical arms according to FIG. 12 and FIG. 13.
Figure 15:
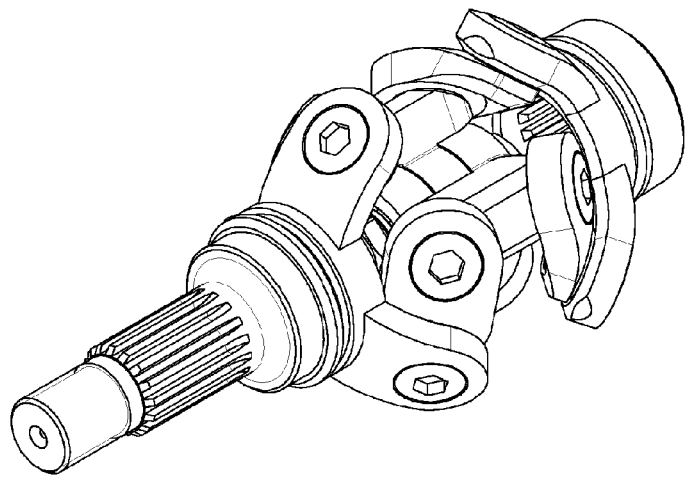
In FIG. 15 there is the joint of FIG. 14 shown in an un-exploded state.
Figure 16:
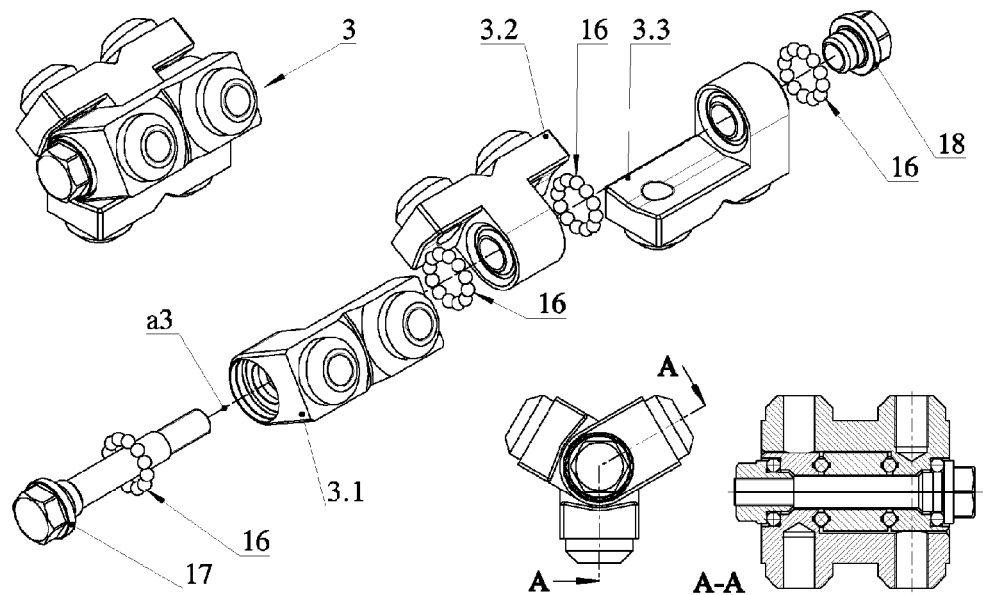
In FIG. 16 there is a stabilising mechanism shown in several views of the joint with three pairs of spherical arms, where the axes of each pair of spherical arms, supported by a stabilising segment, are parallel.
Figure 17:
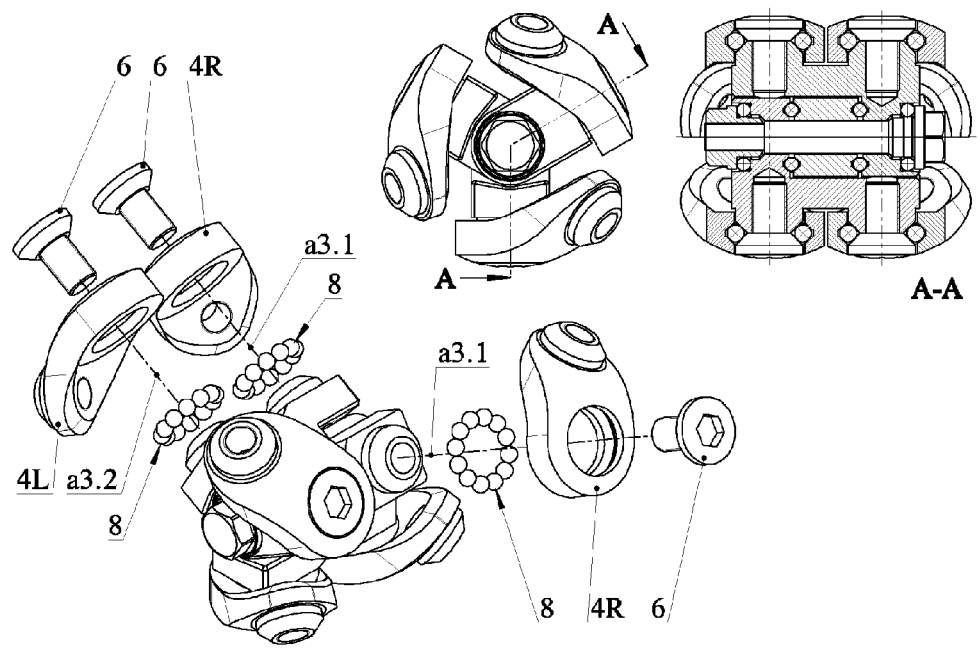
FIG. 17 presents a stabilising mechanism with attached spherical arms, designed for the joint with three pairs of spherical arms, where the axes of each pair of spherical arms, supported by a stabilising segment, are parallel.
Figure 18:
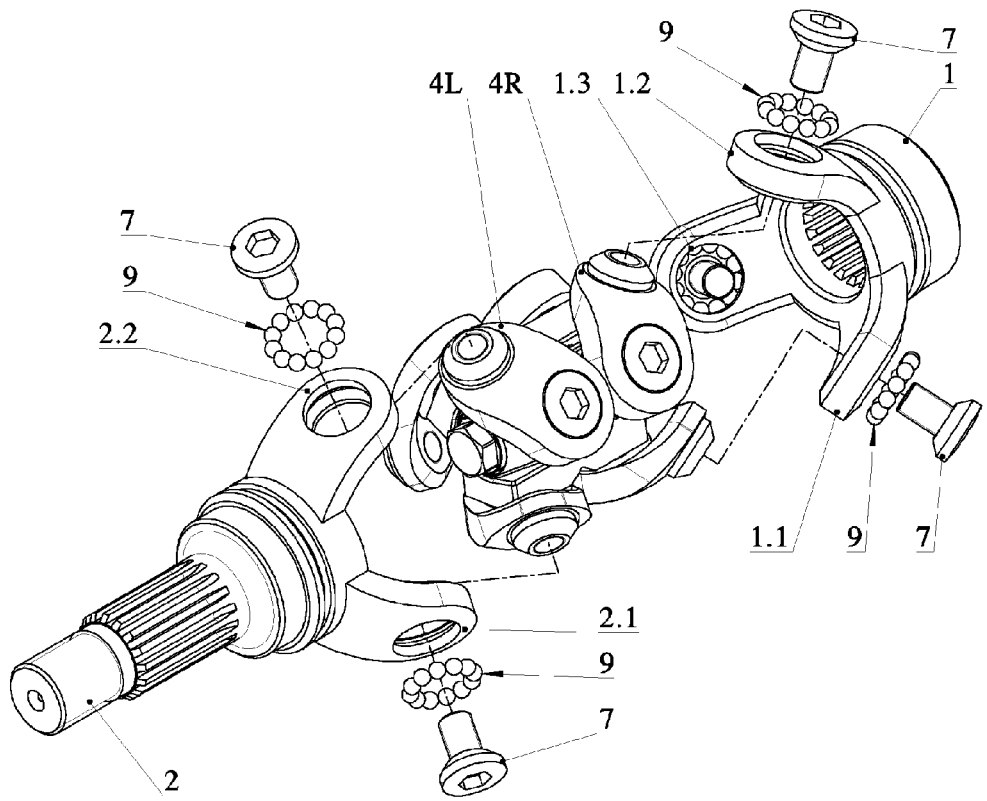
In FIG. 18 a constant velocity joint is shown in a spatial, partially exploded view with the stabilising mechanism and spherical arms according to FIG. 16 and FIG. 17.
Figure 19:
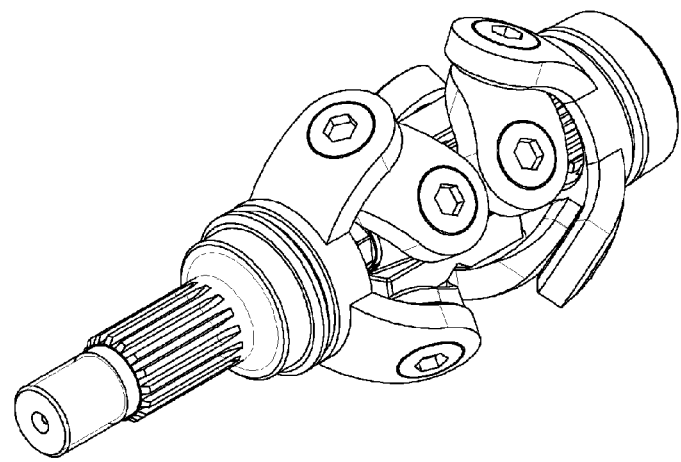
FIG. 19 shows the joint of FIG. 18 in an un-exploded state.

On arms of the input shaft 1 there are rotating nodes 1.1, 1.2, and 1.3 formed with regular spacing considering the axes of the shaft a1 and on arms of the output shaft 2 there are rotating nodes 2.1, 2.2 and 2.3 formed with regular spacing considering the axes of the shaft a2. These rotating nodes are represented by circular openings, the axes of which on the input shaft 1 represent axes of rotating nodes a1.1, a1.2 and a1.3 and the axes of openings on the output shaft 2 represent axes of rotating nodes a2.1, a2.2 and a2.3 (FIG. 3). In all openings there are outer rolling paths of radial-axial bearings formed, in which rolling elements 9 are fitted in. Both shafts (1 and 2) are connected with the rest of the joint by bolts 7, passing through the circular openings on each arm of shafts and screwed into spurs on each spherical arm. The axis of the rotating node a3.1, round which the spherical arm 4L rotates against the stabilising segment 3.1 and the axis of the rotating node a3.2, round which the spherical arm 4R rotates against the same stabilising segment 3.1, are in this technical design coaxial. The same relations between axes of rotating nodes apply also for other two stabilising segments 3.2 and 3.3.

Example No. 2 of the embodiment of the invention is shown in FIG. 12 through FIG. 15. It is a constant velocity joint, containing three pairs of spherical arms arranged differently than in the previous case. The axis of the rotating node a3.1, round which the arm 4R rotates against the stabilising segment 3.1 (3.2 is concurrent with the axis of the rotating node a3.2, round which the arm 4L rotates against the same stabilising segment and both axes intersect each other exactly on the axis a3 of the stabilising mechanism 3 and also exactly in the homokinetic point of the joint. Arms 4L and 4R are identical. Method of rotational mounting of each arm 4L and 4R to each of segments 3.1, 3.2 and 3.3 is similar to the previous case—a circular opening with the outer rolling path of the radial-axial bearing is formed in the body of each spherical arm, with fitted rolling elements 8. The body of each stabilising segment 3.1, 3.2 and 3.3 contains two spurs, carrying one half of the inner rolling path of the radial-axial bearing. The second half of the inner rolling path of the bearing is formed on the head of the bolt 6, which passes through a circular opening in the spherical arm and by rolling elements 8 it anchors the spherical arm 4R and 4L to stabilising segment 3.1, 3.2 or 3.3, so that the arm can rotate only around one of its rotational axes. Connection of spherical arms with the input shaft 1 and output shaft 2 is implemented by the radial-axial bearing of a similar design. Rotating nodes 1.1, 1.2 and 1.3 are formed on arms of the input shaft 1 and rotating nodes 2.1, 2.2 and 2.3 are formed on arms of the output shaft 2, represented by circular openings, containing outer rolling paths of radial-axial bearings. Rolling elements 9 are fitted in these rolling paths. Both shafts (1 and 2) are connected with the rest of the joint by bolts 7, passing through circular openings on each arm of shafts and screwed into spurs on each spherical arm.

Example No. 3 of the embodiment of the invention is shown in FIG. 16 through FIG. 19. This variant of the joint is similar to the previous one, but it is different in angle, which axes of rotating nodes a3.1 and a3.2 form. These axes of rotating nodes intersect each other, but they are parallel. Each of them intersects the axis a3 of the stabilising mechanism 3 in a different point. This variant of the joint has both two homokinetic planes and two homokinetic points. The stabilising mechanism 3 is formed of stabilising segments 3.1, 3.2 and 3.3. Mutual rotational motion of stabilising segments is enabled by rolling elements 16, which serve as radial-axial bearings. Stabilising segments and radial-axial bearings are connected into one whole by bolt 17 and nut 18. Other joint nodes are identical in design as in two previous cases.

Figure 20:
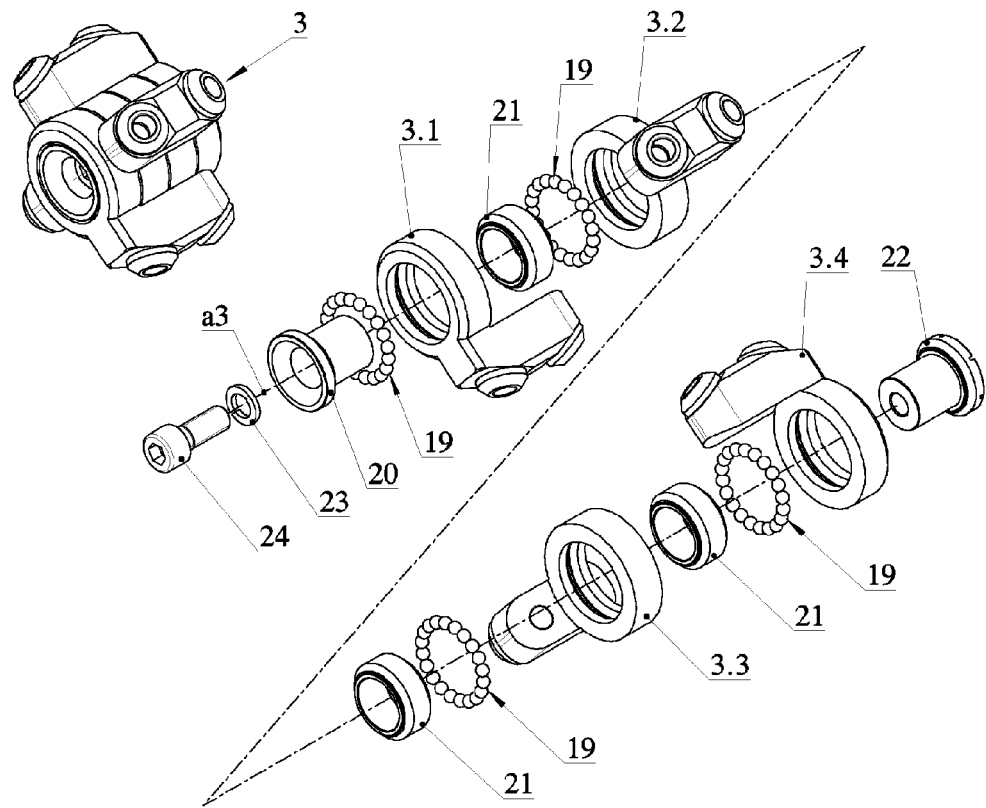
FIG. 20 introduces a stabilising mechanism for a constant velocity joint with four pairs of spherical arms. Axes of spherical arms, supported by one stabilising segment, intersect each other on the axis of the stabilising mechanism.
Figure 21:
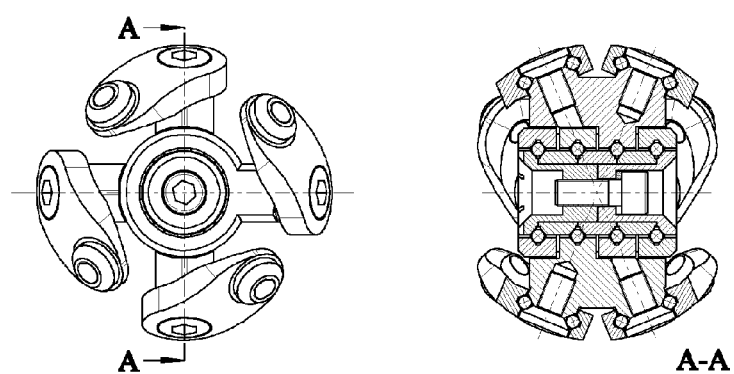
FIG. 21 shows a method of placing of spherical arms on the stabilising mechanism according to FIG. 20.
Figure 22:
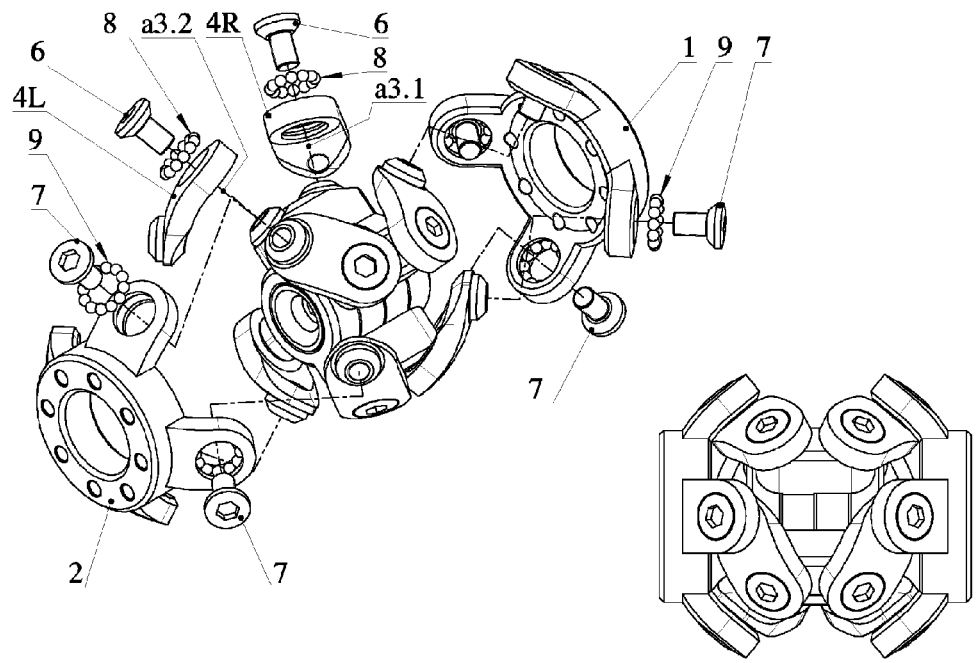
FIG. 22 represents a view on a constant velocity joint shown in an exploded and un-exploded state with four pairs of spherical arms with the same geometric orientation of each pair.

Example No. 4 of the embodiment of the invention is shown in FIG. 20 through FIG. 22. In this variant of the joint, four pairs of spherical arms 4 are used. The stabilising mechanism is composed of four stabilising segments—3.1, 3.2, 3.3 and 3.4. It is advantageous to shape stabilising segments in a way so that instead of two unique segments 3.1 and 3.4 one segment 3.1 can be used twice. Similarly, segments 3.2 and 3.3 can have completely identical shape. Outer rolling paths of the radial-axial bearing are created in bodies of stabilising segments, where rolling elements 19 move. Inner rolling paths of radial-axial bearings are made on other parts of the stabilising mechanism—on a distance ring 21 used three times, an auxiliary element 20 and an auxiliary element 21. All parts are secured in the working position by a screw 24 and spring washer 23. The screw 24 is mounted into the auxiliary element 21. The input shaft 1, as well as the output shaft 2 has on its body four arms created, spaced at regular intervals. Each arm has an opening with the outer rolling path of the radial-axial bearing, formed by rolling elements 9. The way in which spherical arms are attached to the stabilising mechanism and both shafts is the same as in previous versions of the joints. The axes of the rotating nodes a3.1 and a3.2 on each of stabilising segments 3.1 through 3.2 intersect each other and their intersection lies on the axis a3 of the stabilising mechanism 3. However, the axes of the rotating nodes a3.1 and a3.2 might be arranged coaxially or in parallel or their mutual intersection might lie above or under the axis a3 of the stabilising mechanism 3.

Figure 23:
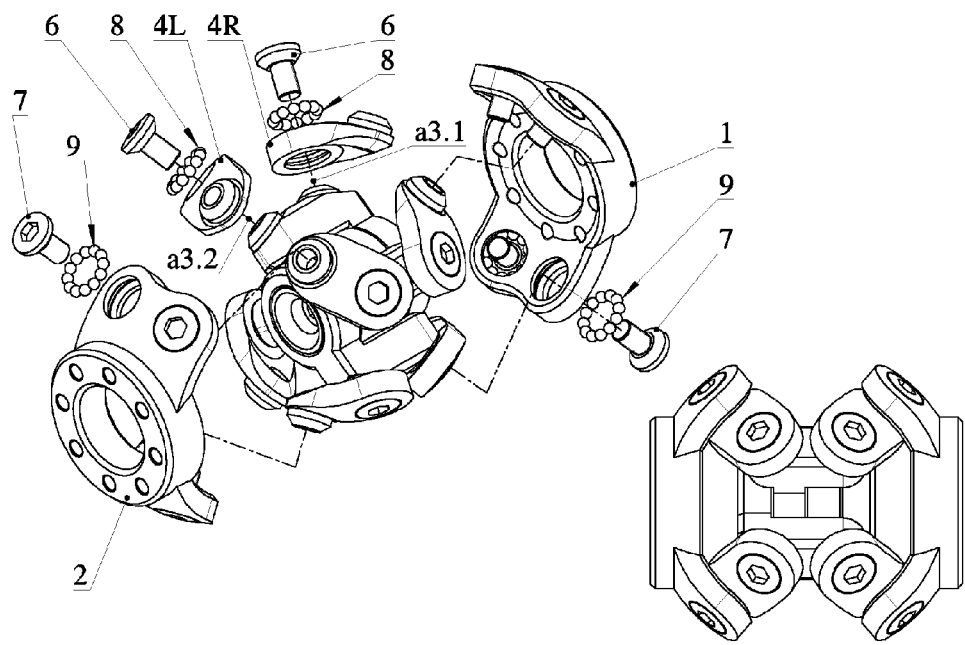
FIG. 23 represents a view on a constant velocity joint shown in an exploded and un-exploded state with four pairs of spherical arms with alternately opposite geometric orientation of each pair.
Figure 24:
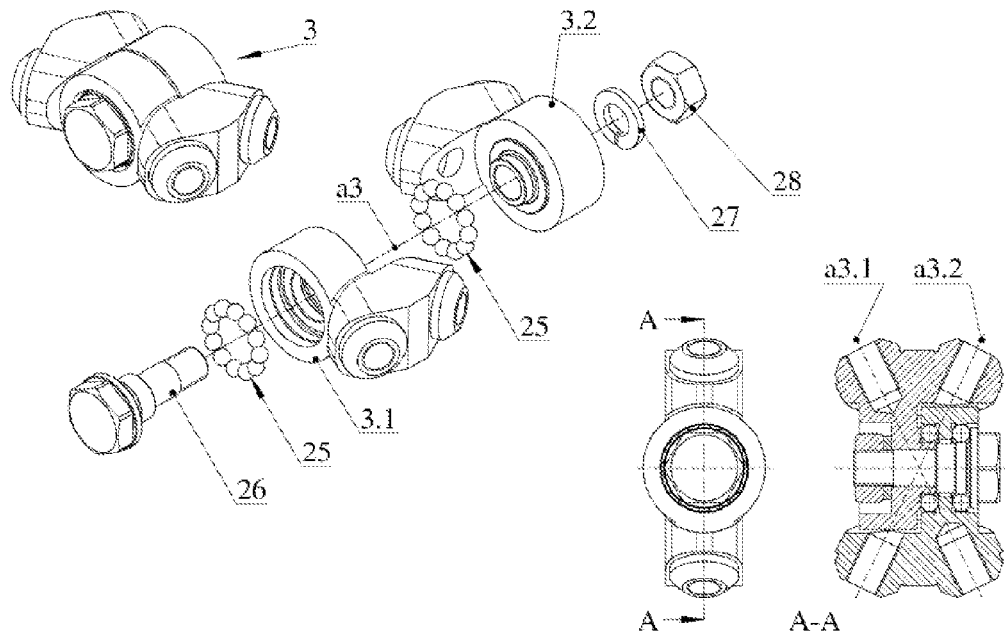
In FIG. 24 there is a stabilising mechanism shown for the joint with two pairs of spherical arms, rotational axes of which, supported by a stabilising segment, intersect each other on the axis of the stabilising mechanism.
Figure 25:
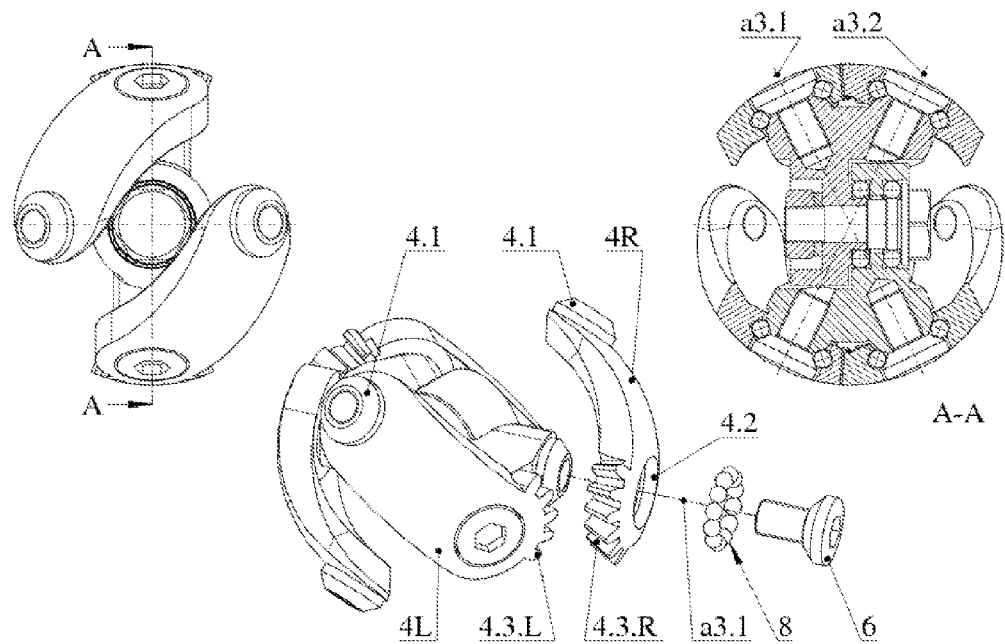
In FIG. 25 there is a stabilising mechanism according to FIG. 24, fitted with two pairs of spherical arms, each with a part fitted with a bevel involute gear.
Figure 26:
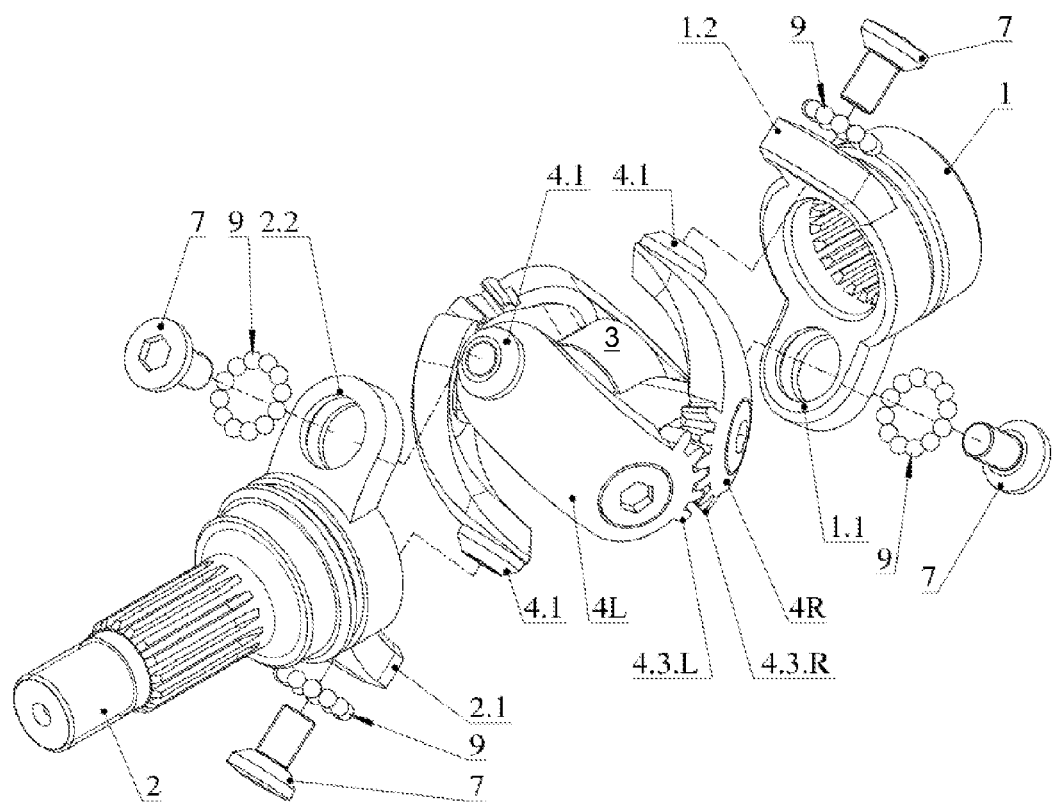
In FIG. 26 a constant velocity joint is shown in a spatial, partially exploded view with the stabilising mechanism and spherical arms according to FIG. 24 and FIG. 25.
Figure 27:
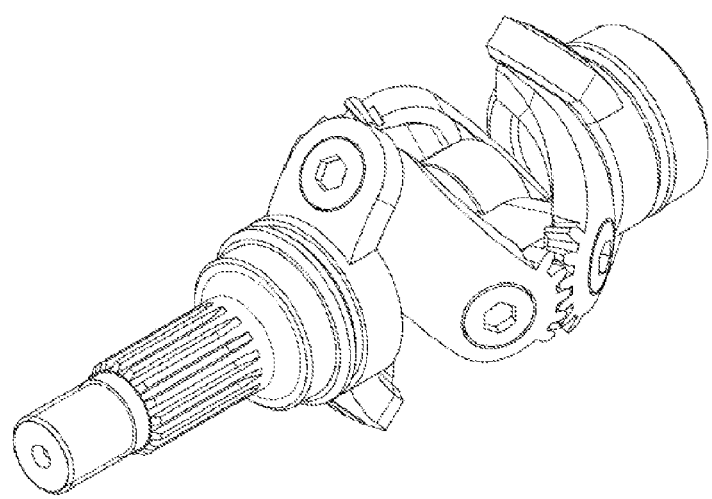
In FIG. 27 the joint of FIG. 26 is shown in an un-exploded state.
Figure 28:
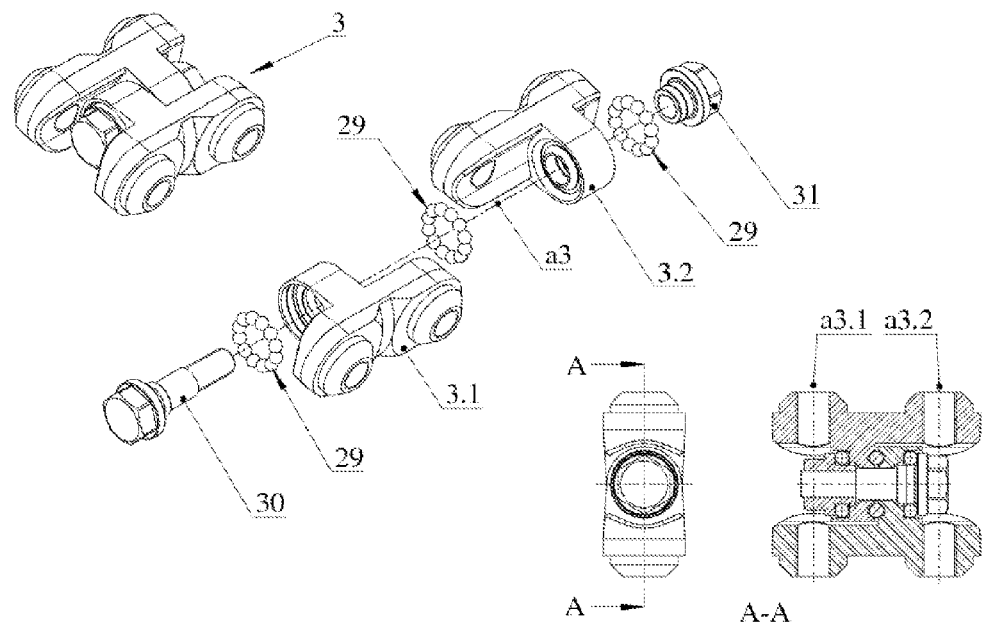
In FIG. 28 a stabilising mechanism is shown for the joint with two pairs of spherical arms, rotational axes of which, supported by a stabilising segment, are parallel.
Figure 29:
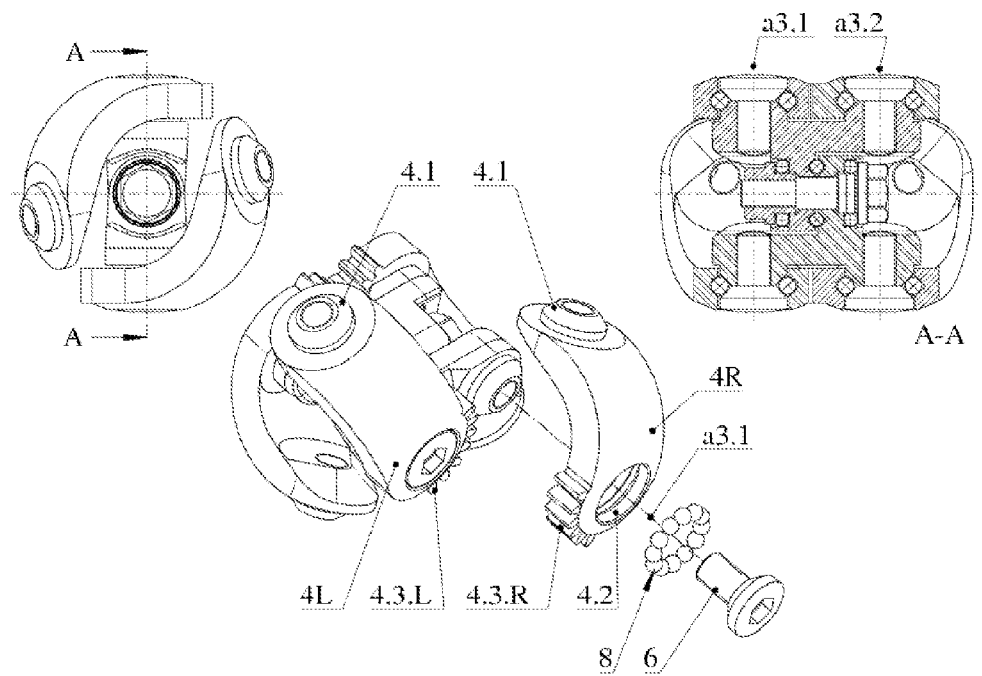
In FIG. 29 the stabilising mechanism according to FIG. 28 is displayed, fitted with two pairs of spherical arms, each with a part fitted with a spur involute gear.
Figure 30:
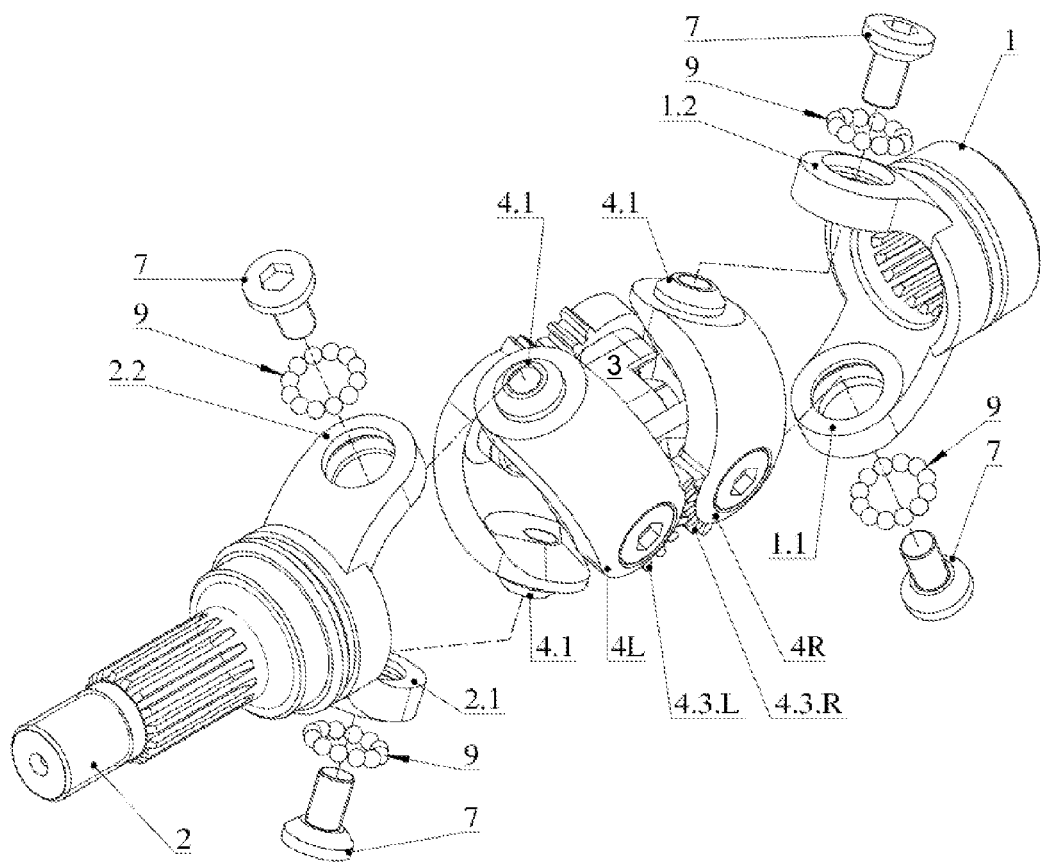
In FIG. 30 a constant velocity joint is shown in a spatial, partially exploded view with the stabilising mechanism and spherical arms according to FIG. 28 and FIG. 29.
Figure 31:
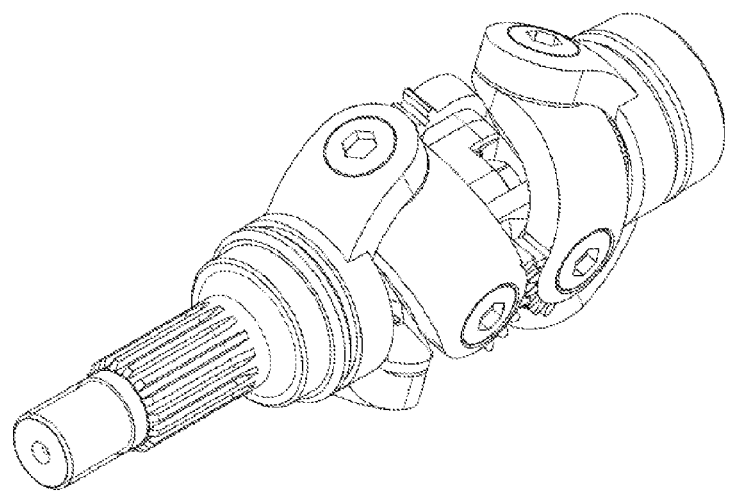
In FIG. 31 there is the joint of FIG. 30 shown in an un-exploded state.

Example No. 5 of the embodiment of the invention is shown in FIG. 23. This joint is composed of the same components as the previous joint. The stabilising mechanism 3 is completely identical. Spherical arms, however, have alternately opposite geometric orientation. Shape of arms of the input shaft 1 and output shaft 2 is different now—arms are not arranged at regular intervals, but they are grouped together, always two and two arms. Other nodes of the joint are identical in design as in the previous case.

Example No. 6 of the implementation of the invention is shown in FIG. 24 through FIG. 27. This is a case of a constant velocity joint, where only two pairs of spherical arms are used. The stabilising mechanism 3 consists of two stabilising segments 3.1 and 3.2, of two groups of rolling elements 25 functioning as a radial-axial bearing, the bolt 26, the spring washer 27, and the nut 28. Two left 4L and two right 4R spherical arms are connected to the stabilising segments 3.1 and 3.2 by rotating hubs 4.2. The teeth of the conical involute gear 4.3.L and 4.3.R are on the spherical arms in parts adjacent to the stabilising segment. The peak of the involute conical teeth lies in the homokinetic point of the joint. The teeth 4.3.L and 4.3.R on both of the arms are arranged in such a way that both arms are engaged with each other. The gear on both arms in each pair provides for the same mirror-like position of left and right spherical arms in relation to the homokinetic plane. The rolling elements 8 are inserted in the rolling paths, created in the bodies of spherical arms, which serve as a radial-axial bearing of each spherical arm. Each of the spherical arms is mounted to the stabilising mechanism by a bolt 6.

On the input shaft 1 and the output shaft 2, there are two arms formed, where the rotating hubs (1.1, 1.2 and 2.1, 2.2) are located, represented by the openings containing the outer rolling paths of the radial-axial bearings. The axis of each of the rolling paths, and thus also the axis of the radial-axial bearing, points to the homokinetic point of the joint. The rolling elements 9 are inserted into each of the rolling paths of both of the shafts. The shafts are connected with the rest of the joint by bolts 7, anchored into the rotating hubs 4.1 on the spherical arms 4L and 4R.

Example No. 7 of the implementation of the invention is shown in FIG. 28 through FIG. 31. It is a constant velocity joint with two pairs of spherical arms. The rotational axes of the pair of the spherical arms, which are carried by the stabilising segments 3.1 and 3.2, do not intersect each other on a single stabilising segment, but are run in parallel. Each of these two axes has its point of intersection with the axis of the stabilising mechanism. This joint has thus two homokinetic points and two homokinetic planes. The stabilising mechanism 3 consists of the stabilising segments 3.1 and 3.2, of three groups of rolling elements 29, of the bolt 30, and of the special nut 31. The stabilising segment 3.1 is identical with the segment 3.2. The special nut 29 has rolling paths integrated in its body of one of three radial-axial bearings of the stabilising mechanism 3. The pair of spherical arms is then formed by the left spherical arm 4L and right spherical arm 4P. In the parts adjacent to the stabilising segment, both of the spherical arms have the involute spur gear 4.3.L and 4.3.R with straight teeth formed. This gearing provides the same mirror-like position of the left spherical arm and the right spherical arm in relation to both homokinetic planes. Each spherical arm has rolling elements 8 inserted in its rolling path and by rotating hub 4.1 and by bolt 6 it is anchored to the stabilising mechanism. The input shaft 1, as well as the output shaft 2, have on their bodies two symmetrically spaced arms with the rotating hubs nodes 1.1, 1.2 and 2.1, 2.2 formed. In the openings, which represent the rotating hubs, there are outer rolling paths of the radial-axial bearings formed, consisting of groups of rolling elements 9. The bolts 7 are used to form connections between rotating hubs on the shafts and the spherical arms.

Since constant velocity joints often work in an environment, which is unfavourable to the rolling bearings, it is advantageous to protect the constant velocity joint against dust, water penetration or other impurities. The sensitive parts of the joint may be covered by a shape-flexible cap of elastic material in a form as is now common in other types of constant velocity joints. It is also possible to protect each rotation hub separately with rubber or plastic seals commonly used in engineering practice.

INDUSTRIAL APPLICABILITY

The field of application of constant velocity joints with a fixed centre point is very broad. It is possible to employ this new type of the joint mainly in passenger cars with front-wheel drive or all-wheel drive, in trucks and buses, rolling stock, the fuel systems of helicopters, shipbuilding, etc. This type of joint may also be used as a replacement of a bevel gearing in crankshafts used in wind- or water-power stations or in designing other machines. In general, this type of joint may be used wherever there is a requirement to combine two shafts intersecting in one point and forming a variable or constant angle between their axes, so that the angular velocity and rotation of one shaft be at every moment the same as the angular velocity and rotation of the other shaft.

What is claimed is:

1. Constant velocity joint, comprising:
   an input shaft provided with two rotary hubs,
   an output shaft provided with two rotary hubs,
   a stabilization mechanism formed by two stabilization segments, which are mutually rotationally tied in such a way as to allow mutual rotating of stabilization segments around an axis of the stabilization mechanism, and
   two pairs of spherical arms, each spherical arm being provided with a respective pair of rotary hubs,
   in each pair of spherical arms, one spherical arm of said pair being rotationally mounted by one of its rotary hubs to one of the rotary hubs of the input shaft, and rotationally mounted by its other rotary hub to one of the stabilization segments of the stabilization mechanism, and
   the other spherical arm in said pair of spherical arms being rotationally mounted by one of its rotary hubs to one of the rotary hubs of the output shaft and rotationally mounted by its other rotary hub to another one of the stabilization segments of the stabilization mechanism,
   wherein the respective spherical arms in each of the two pairs of spherical arms are connected to each other by a mechanical linkage, so that they carry out respective motions which are mirror-like with respect to a plane perpendicular to the axis of the stabilization mechanism.

2. Constant velocity joint according to claim 1, wherein each stabilization segment has a rotary hub axis around which one corresponding spherical arm of said pair of spherical arms rotates, and another rotation hub axis around which the other corresponding spherical arm of said pair of spherical arms rotates, and these two rotary hub axes intersect with each other, and their point of intersection lies on the axis of the stabilization mechanism.

3. Constant velocity joint according to claim 1, wherein the rotary hub axis on the stabilization segment around which the one spherical arm of said pair of spherical arms rotates, is parallel to the rotation hub axis on the same stabilization segment, around which the other spherical arm of said pair of spherical arms rotates.

4. Constant velocity joint according to claim 1, wherein the rotary hub axis on the stabilization segment around which the one spherical arm of said pair of spherical arms rotates, and the rotation hub axis on the same stabilization segment around which the other spherical arm of said pair of spherical arms rotates, mutually intersect and their point of intersection lies above the axis of the stabilization mechanism.

5. Constant velocity joint according to claim 1, wherein the rotary hub axis of the stabilization segment around which the one spherical arm of said pair of spherical arms rotates, and the rotation hub axis on the same stabilization segment around which the other spherical arm of said pair of spherical arms rotates, mutually intersect and their point of intersection lies below the axis of the stabilization mechanism.

6. Constant velocity joint according to claim 1, wherein the mechanical linkage comprises involute gears.

7. Constant velocity joint according to claim 1, wherein parts of the constant-velocity joint in a space between the input shaft and the output shaft are protected against penetration of dirt and liquids by a one-piece or multi-piece elastic cover.

8. Constant velocity joint according to claims 1, wherein each rotary hub of the constant velocity joint is protected against penetration of dirt or liquids by a corresponding sealing.

* * * * *